(12) United States Patent
Lu

(10) Patent No.: US 6,713,718 B1
(45) Date of Patent: Mar. 30, 2004

(54) SCORING PROCESS AND APPARATUS WITH CONFOCAL OPTICAL MEASUREMENT

(75) Inventor: Yuesheng Lu, Farmington Hills, MI (US)

(73) Assignee: VI Engineering, Inc., Farmington Hills, MI (US)

(*) Notice: Subject to any disclaimer, the term of this patent is extended or adjusted under 35 U.S.C. 154(b) by 0 days.

(21) Appl. No.: 10/306,005

(22) Filed: Nov. 27, 2002

Related U.S. Application Data

(60) Provisional application No. 60/333,555, filed on Nov. 27, 2001.

(51) Int. Cl.[7] .................................... B23K 26/04
(52) U.S. Cl. .................................... 219/121.69
(58) Field of Search ............... 219/121.69, 121.67, 219/121.68, 121.78, 121.79, 121.83

(56) References Cited

U.S. PATENT DOCUMENTS

| | | |
|---|---|---|
| 5,496,059 A | 3/1996 | Bauer |
| 5,522,616 A | 6/1996 | Bauer et al. |
| 5,611,564 A | 3/1997 | Bauer |
| 5,738,367 A | 4/1998 | Zichichi et al. |
| 5,744,776 A * | 4/1998 | Bauer .................. 219/121.7 |
| 5,797,619 A | 8/1998 | Bauer et al. |
| 5,883,356 A | 3/1999 | Bauer et al. |
| 5,887,009 A | 3/1999 | Mandella et al. |
| 5,948,292 A * | 9/1999 | Tanaka et al. ......... 219/121.82 |
| 6,079,733 A | 6/2000 | Towler |
| 6,215,094 B1 * | 4/2001 | Dausinger et al. ..... 219/121.62 |
| 6,267,918 B1 | 7/2001 | Bauer |
| 6,294,124 B1 | 9/2001 | Bauer et al. |
| 6,418,153 B1 | 7/2002 | Engelhardt et al. |
| 6,423,925 B1 | 7/2002 | Sukhman et al. |
| 6,423,933 B2 | 7/2002 | Nicholas et al. |
| 6,433,304 B2 | 8/2002 | Okumura et al. |
| 6,452,710 B1 | 9/2002 | Hiraga et al. |
| 6,586,703 B2 * | 7/2003 | Isaji et al. ............ 219/121.62 |

OTHER PUBLICATIONS

2002/0130113, Sep. 2002, US.
2001/0010423, Aug. 2001, US.

* cited by examiner

Primary Examiner—Tom Dunn
Assistant Examiner—Jonathan Johnson
(74) Attorney, Agent, or Firm—Young & Basile, PC

(57) ABSTRACT

A method and apparatus for scoring a slot through one surface of an article by a scoring light beam confocally determines the remaining depth in the article between the bottom of the slot and an opposed second surface to automatically control the application of the scoring light beam at a particular point in the slot to maintain a constant depth between the bottom of the slot and the opposed second surface along the entirety of the slot despite any surface dimensional variations in the article. In one aspect, a detecting laser beam is directed into the slot formed by the scoring laser beam during formation of the slot, with only light reflected from a confocal plane established at the predetermined bottom depth of the slot being reflected to a detector.

14 Claims, 4 Drawing Sheets

SCORING PROCESS AND APPARATUS WITH CONFOCAL OPTICAL MEASUREMENT

CROSS REFERENCE TO CO-PENDING APPLICATION

Applicant claims the benefit of the priority filing date of Nov. 27, 2001 of U.S. Provisional Patent Application S.No. 60/333,555, now abandoned, the contents of which are incorporated herein in its entirety.

BACKGROUND

Current automotive vehicles include passive inflation devices, commonly known as "airbags", which inflate during a collision to impede the forward momentum of a vehicle passenger. Each airbag is stored in a deflated state within a compartment behind the vehicle instrument panel. An inflation device, currently based on pyrotechnic gas generation, is activated by a collision sensor to generate the gas used to inflate the airbag. The expansion force created by the gas generation propels the airbag through a pre-weakened panel formed in the instrument panel.

The pre-weakened panel typically includes a pre-weakened edge and a non-weakened side used as a pivot point for the entire panel. The instrument panel skin, typically formed of vinyl plastic is pre-weakened, typically by scoring from the backside. Laser scoring apparatus have been employed to form a slot or a series of spaced apertures in the backside of the instrument panel skin to a predetermined depth to form the pre-weakened seamless panel edge.

It is imperative for appearance as well as proper timed deployment of the airbag during a collision, that the scored slot be of a constant and appropriate depth along the entire pre-weakened edge of the panel. If the slot is too deep, the slot may be visible from the exterior side of the instrument panel. At the same time, any force exerted on the panel from the exterior side of the instrument panel could break the remaining portion of the scored edge.

Alternately, if the scored slot is too shallow, there may not be sufficient force generated by the airbag during deployment to break through the pre-weakened edge along the entire extent of the pre-weakened edge. This could interfere with the proper timed full deployment of the airbag.

In order to insure the constant and appropriate depth slot, various measurement techniques have been employed, including laser triangulation, ultrasonic measurement, and light transmission through remaining material at the score slot.

While all of these measurement techniques have advantages and disadvantages, the disadvantages are amplified when it is desirable to mount the typically thin outer skin of the instrument panel on one or more backing layers and a rigid substrate. The pre-weakened edge must be formed through all of the substrate and backing layers and into the predetermined depth in the instrument panel skin. Measurement of the slot or hole depth when a backing and/or substrate is employed is much more difficult due to the depth of the slot or hole which blocks a portion of the light to and from the sensor making it difficult to accurately measure the exact depth of the slot or hole. In the light transmission method, the remaining thickness of material in the instrument panel skin must be thin enough to let enough light pass through for measurement. Sometimes the remaining thickness is thinner than desired. In addition, the light transmission method is dependent upon the optical properties of the material. When the manufacture changes material, it must recalibrate the measurement process and adjust the scoring process thereby increasing cost and production downtime. The ultrasound measurement method lacks measurement precision.

Thus, it would be desirable to provide a measurement apparatus and method used with a laser scoring process to accurately measure the depth of the score slot or holes despite any additional backing layers and substrates mounted on the outer skin. It would also be desirable to provide a slot measurement apparatus and method which provides accurate slot depth measurement despite any exterior surface irregularities in the outer layer or skin.

SUMMARY

The present invention is an apparatus and method for forming a slot of a predetermined configuration in an article, with the remaining depth between the bottom of the slot and the opposed surface of the article held constant along the entirety of the slot despite any surface dimensional variations in the article.

In one aspect, the present inventive method includes the steps of:

generating a scoring light beam;

using the scoring light beam to form a slot in the article of a predetermined depth in the first surface; and confocally determining the remaining thickness in the article between a bottom of the slot and the opposed second surface of the article.

In another aspect of the invention, the inventive apparatus includes a source for directing a scoring laser beam onto a first surface of an article to form a slot in the article, and means for confocally sensing the remaining thickness in the article between a bottom of the slot formed by the beam and the other of the first and second surfaces of the article.

The apparatus and method of the present invention uniquely and efficiently provides a constant remaining thickness in an article between the bottom of a scored slot in the opposed surface of the article along the entirety of the slot despite any dimensional surface variations in the article. The confocal slot depth detection of the present apparatus and method enables the depth of the slot to be determined in real time to accurately control the application of a scoring laser beam during formation of each point along the entirety of the slot.

BRIEF DESCRIPTION OF THE DRAWING

The various features, advantages and other uses of the present invention will become more apparent by referring to the following detailed description and drawing in which.

DETAILED DESCRIPTION

Confocal Optic Principals

Figure 1:
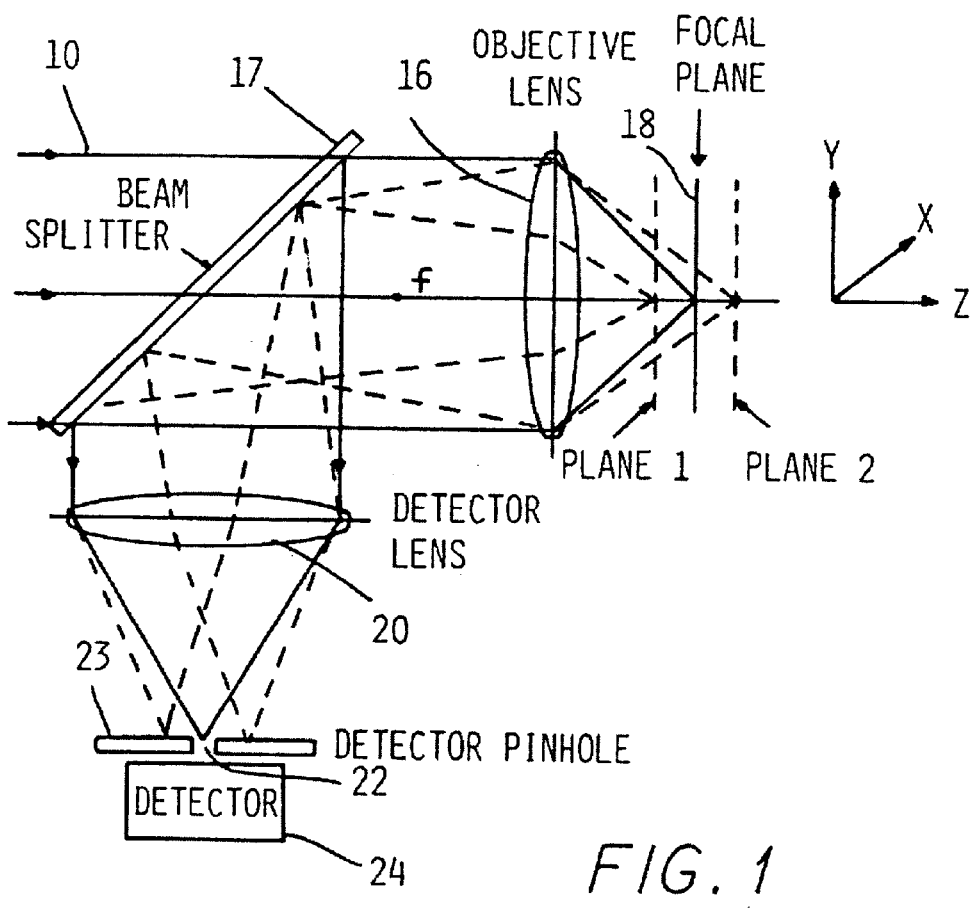
FIG. 1 is a pictorial representation of a confocal optical system for detecting light intensity at a confocal plane.

FIG. 1 depicts the principals of a confocal optical system. Confocal optics or imaging is used in microscopes to obtain fine lateral and axial resolutions and layer imaging. As shown in FIG. 1, a light beam 10 from a light source, not shown, which may be a laser beam generated from a laser, is directed toward a beam splitter 17. The light beam passes through the beam splitter 17 toward a first objective lens 16. The first lens 16 focuses the light beam 10 onto a reflective surface or focal plane denoted generally by reference number 18.

Light is reflected off of the surface 18 back through the reflective surface of the beam splitter 17. This light is reflected by the beam splitter 17 through a second detector lens 20 spaced from the beam splitter 17 and from a light intensity detector 24. The focused light passes through a pinhole 22 in a member 23 onto the detector 24 which provides an output signal indicative of the detected light intensity.

The distance between the pin hole 22 and the beam splitter 17 is selected such that only substantially all of the light reflected off of the surface 18 will be focused and able to pass through the pinhole 22 to the detector 24. Light reflected off of other planes 1 and 2 spaced at different distances from the second lens 20 will be mostly blocked by the member 23 in which the pinhole 22 is formed.

Figure 2A:
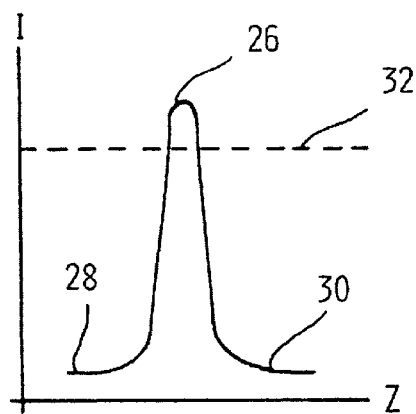
FIG. 2A is a graph depicting light intensity versus the distance of the confocal plane shown in FIG. 1 from a reference plane.

As shown in FIG. 2A, this confocal optical concept provides a sharp increase in detected light intensity only at a certain surface spacing 18 from the first focusing lens 16. Light reflected off of the other planes 1 and 2 will be mostly blocked by the member 23 thereby providing low detected light intensities from the planes 1 and 2.

Usage of this confocal optical imaging principal enables a light intensity threshold denoted by reference number 32 in FIG. 2A to be established and used as a measurement of the position of the surface 18 from a reference point or plane. When the first lens 16 is moved in a axial direction, the focal plane or surface 18 moves accordingly in the same distance. This provides a means of focusing the beam into a different depth in a sample and thus enables inspecting features in different depths in the sample with great depth discrimination.

Figure 2B:
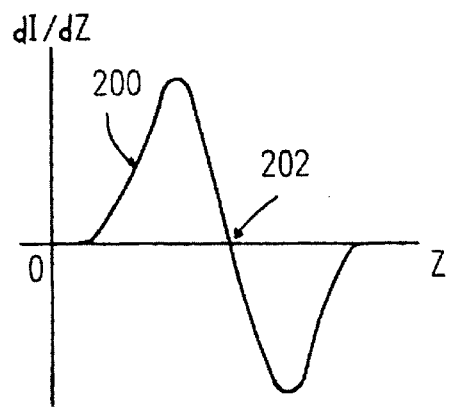
FIG. 2B is a graph depicting an alternate technique for determining the confocal position.

Another technique for determining confocal position is shown in FIG. 2B. If the optics used to focus the reflected confocal beam onto a detector are dithered or moved in an axial direction with small magnitude, the confocal point oscillates in a small magnitude relative to a pin hole in a spaced filter. This in turn causes oscillation of the received signal at a detector. By measuring the signal changes, the slope of intensity or the derivative of the light intensity I relative to the axial position Z (dI/dZ) can be measured and plotted versus Z, as shown in FIG. 2B. The zero crossing point (dI/dZ=0) shown by reference number 202 in FIG. 2B, corresponds to the peak intensity 26 shown in FIG. 2A and defines the confocal point.

Using the slope 0 crossing point as the threshold to stop further application of the scoring beam 84 when the bottom of the slot 38 reaches the desired depth may have advantages over the threshold approach using threshold 32 shown in FIG. 2A. Because different material have different optical reflectivities, threshold 32 will have different values depending upon the material being scored. Thus, the optical system needs to be calibrated each time a different material is used. However, with the slope 0 crossing technique shown in FIG. 2B, the position of the 0 crossing point (dI/dZ–O) is independent of material optical reflectivity. Thus, no calibration is needed.

In addition to dithering or oscillating the focusing lenses or filters, one can also dither or oscillate the scoring material 42 itself in the Z direction to obtain the desired 0 crossing point.

Figure 3:
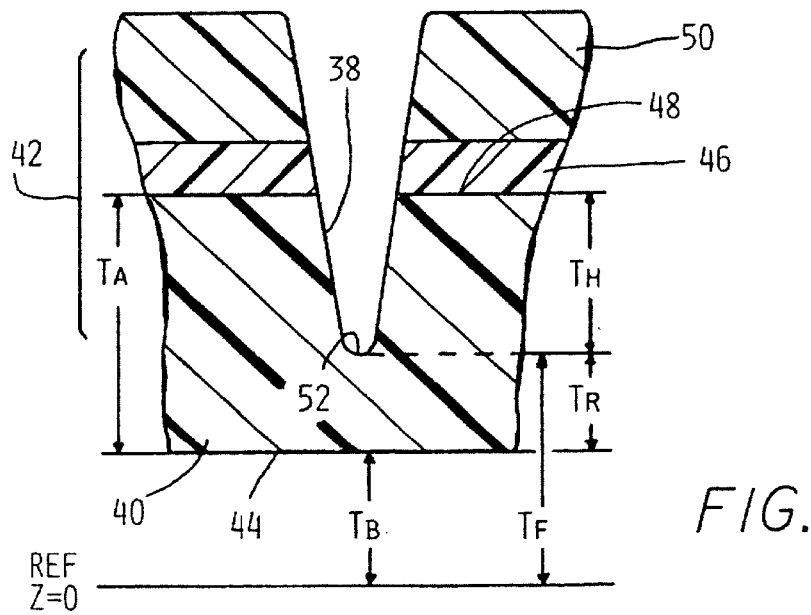
FIG. 3 is a pictorial representation of a laser score slot formed in a multi-layer instrument panel assembly.

The above-described confocal imaging principal can be uniquely applied to a laser scoring apparatus and method according to the present invention which is used to score or form a slot 38 of a predetermined depth in a thin flexible sheet or material layer 40 in FIG. 3. By way of example only, the material layer 40 is employed as an outer skin layer of an instrument panel assembly used in an automotive vehicle whereby the slot 38 forms a pre-weakened edge of irregular shape in the outer material layer 40 to be used to form a seamless panel in the instrument panel for passage of an inflating airbag mounted behind the instrument panel skin assembly 42. As used herein, the term "slot" means a continuous or discontinuous recess formed in a sample or material layer as well as a series of discreet apertures or bores formed in the material layer which are spaced apart at small distances to define a preweakened edge.

Although the principals of the present confocal imaging apparatus process apply to an instrument panel assembly having only a single outer layer 40, the present confocal imaging apparatus and process are advantageously employed with a multiple layer instrument panel assembly 42 formed of the outer layer 40 having an exterior surface 44, and one or more support layers, such as a backing layer 46 typically adhesively joined to the opposite surface 48 of the outer skin or material layer 40 and a somewhat rigid substrate 50 typically adhesively joined to the backing layer 46.

The slot 38 is formed through all three layers 40, 46 and 50 of the instrument panel assembly 42 by a suitable scoring apparatus, such as laser beam generated from a laser. Such laser scoring apparatus are commercially available from Jenoptik, AG of Jena, Germany and RPT in Auburn Hills, Mich.

Although the slot 38 extends through the entire thickness of the substrate 50 and the backing layer 46 and into a predetermined distance through the outer skin layer 40, it is the depth of the slot 38 in the outer skin 40 that determines the critical remaining thickness labeled $T_R$ in establishing a seamless scored panel which allows the airbag, in the present application example, mounted behind the instrument panel assembly 42 to rupture the outer skin 40 along the slot 38 for proper timed deployment and inflation.

The material and slot dimensions shown in FIG. 3 include:

$T_A$ is total thickness of outer skin 40 at the location of the slot 38;

$T_B$ is the position of the outer surface 44 of the skin 40 from a reference plane;

$T_F$ is the position of the confocal plane at the bottom of the slot 38;

$T_H$ is the slot 38 depth from the back surface of the outer skin 40; and $T_R$ is the remaining thickness if the outer skin between the surface 44 and the bottom 52 of the slot 38.

Figure 4:
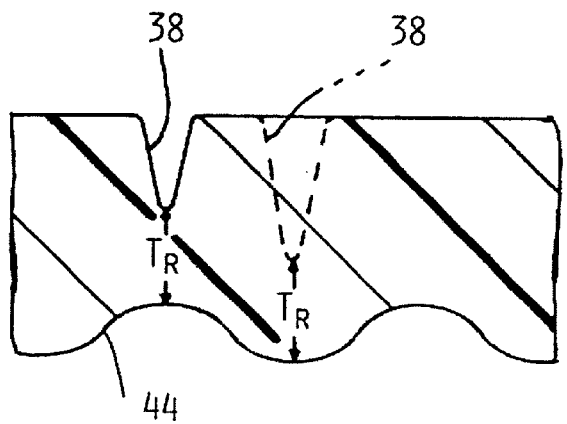
FIG. 4 is a pictorial representation showing the use of another aspect of the present invention in measuring laser score slots in material of varying thickness.

The dimension $T_B$ is measured at the location of the bottom 52 of the slot 38 in the outer skin 40, as described hereafter. $T_F$ is controlled by the confocal setup as also described hereafter. In this manner, the remaining thickness $T_R$ can be determined from the equation $T_R = T_F - T_B$. This accommodates irregularly shaped outer surfaces 44 of the outer skin 40 since $T_F$ can be controlled to follow $T_B$ in order to provide a constant $T_R$ as is shown in FIG. 4. In this arrangement, $T_R$ is maintained constant despite irregularities, such as skin graining or other surface ornamentation in the surface 44 by varying the depth of the slot 38.

Figure 5:
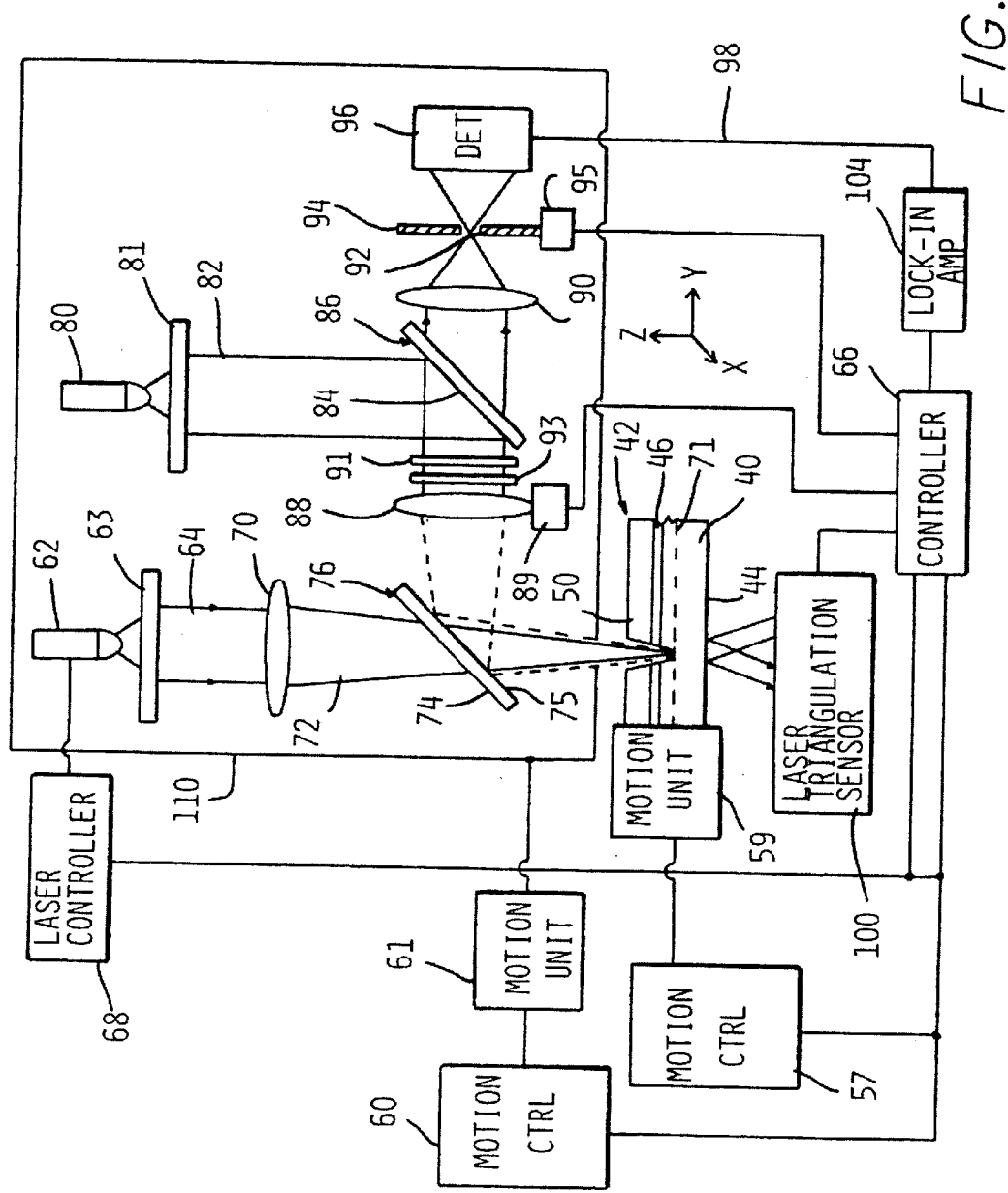
FIG. 5 is a pictorial representation of a first aspect of a confocal laser scoring measurement apparatus according to the present invention.

One aspect of the present apparatus and method is depicted in FIG. 5 for forming the slot 38 in a multi-layer instrument panel assembly 42 formed of the outer skin 40, an intermediate backing layer 46 and an innermost substrate 50. It is desired in this application example that the remaining thickness $T_R$ between the bottom 52 of the slot 38 and the outer surface 44 of the outer skin or material layer 40 remain constant over the entire length of the slot despite any surface variations in the outer surface 44.

Before describing the confocal optical imaging system of the present invention depicted in FIG. 5, a brief explanation will now be provided regarding material location and laser movement. Since the slot 38 to be formed in the instrument panel material assembly 42 typically has an elongated arcuate or three sided lengthwise shape forming a panel hinged about a non-scored edge, at least one of the optics used to form the scored slot 38 or the instrument panel assembly 42 must be moved in the X and Y planes to accommodate the desired shape of the slot 38. Z axis mounting may also be required to accommodate surface irregularities in the skin surface 44. The optics is controlled by a suitable motion controller 60 which is coupled to a motion unit 61, such as an X and Y table, robotic arm, etc., shown in FIG. 5. Thus, by example only, the motion controller 60 is shown as controlling the position of the laser 62 and the remainder of the optical elements, including the slot depth detection optics described hereafter, all shown by block 110 used to generate the scoring beam 64 under the control of the suitable control unit or controller 66, such as a central processor based controller executing a memory stored program. Alternately, the material assembly 42 may be mounted on a plate 59 movable in X and Y directions (optionally in the Z direction) with respect to the stationary laser 62 by a motion controller 57.

By way of example only, the controller 66 also sends control signals to a laser controller 68 which controls the amount of power and/or pulse time period for the laser 62 to generate the wider scoring beam 64 to form the required depth slot 38. The controller 66, through the motion controller 57 and 60, can also control the relative motion speed of the scoring laser 62 and the material assembly 42 to control the depth of the slot 38. The operation of the laser controller 68 is well known in the art and the use of the laser controller 68 to provide different time periods and power to the laser 62 need not be described in detail herein.

In operation, the laser 62 generates the scoring beam 64 which is converted by a beam expander 63 into a parallel beam directed to a first focusing lens 70. The first lens 70 focuses the scoring beam 64 into a focused beam directed to a confocal plane 71 in the sample or material assembly 42. The focused beam 72 passes through a first surface 74 and a second surface 90 of a beam splitter 76 before impinging onto the confocal plane 71 which is established at the bottom 52 or desired depth of the slot 38. The scoring beam 64 thus forms the slot 38 of a predetermined depth through the substrate 50, backing layer 46 and partially through the outer material layer or skin 40 as described above.

Concurrent with the generation of the scoring beam 64, a second light source, such as a laser 80 generates a probe beam 82 which is converted to a wider parallel beam by a beam expander 81 and directed toward a first surface 84 of a second beam splitter 86. The second beam splitter 86 is optionally a polarized beam splitter which only lets light with one linear polarization pass through totally and reflects only light with an orthogonal linear polarization. A portion of the probe beam 82 with an orthogonal linear polarization is reflected by the surface 84 through a quarter wave plate 91. The quarter wave plate 91 converts the linear polarization of the beam 82 to a circular polarization and, when the circularized light is reflected back from the sample 42, the quarter wave plate 91 converts the light back to a linear polarization in the orthogonal direction. This enables the reflected light to pass only through the second beam splitter 86 to a detector 92 and not be reflected back to the laser 80. This prevents the probe laser 80 from interference with the reflected light so as to make laser power intensity more stable.

The light beam passes through the quarter wave plate 91 and a filter 93 which prevents scoring light from impinging on the detector 96 and then through a second focusing lens 88 onto the rear reflective surface 90 of the first beam splitter 76. The second lens 88 is mounted on a movable lense mount 89 controlled by signals from the controller 66 to accommodate different locations of the confocal plane 71 in the sample 42.

The probe beam 82 is reflected off of the rear surface 90 of the beam splitter 76 into the slot 38 being formed by the scoring beam 64. A portion of the probe beam 82 will be reflected out of the bottom 52 of the slot 38 and from the rear surface 90 of the first beam splitter 76 back through the focusing lens 88 where it is defocused to a parallel beam directed toward the second beam splitter 86. This portion of the reflected probe beam will pass through the second beam splitter 86 and be focused by a third focusing lens 90 through a aperture or pinhole 92 in a member or filter 94 disposed at a fixed or variable distance from a light intensity detector means 96. A movable mounting unit 95 supports the filter 94 and receives control signals from the controller 66 to vary the confocal plane as necessary. Movement of the second lens 88 or the filter 94, as described above, allows accommodation of the different locations of the confocal plane 71 in the sample 42. Further, the sample 42 can be moved in the Z direction by a motion unit 59 controlled by a motion controller 57 under the control of the controller 66. In addition, all three described means for changing the location of the confocal plane 71 can be used to provide dithering for the slope zero measurement technique described above.

When two lasers, such as the scoring laser 62 and the probe laser 80, are used, both lasers 62 and 80 need to be aligned so that the respective laser beams are collinear and overlapped on the bottom 52 of the slot 38. When moving or scanning the lasers 62 and 80, the alignment of the laser beams remains in tact. This insures that the probe beam 82 always is directed to the bottom 52 of the slot 38.

As described in the confocal imaging concept shown in FIG. 1, only the light reflected off of the confocal plane 71 impinges upon the detector elements of the detector 96, with light from other planes being substantially blocked by the member 94.

The detector 96 is capable of generating an output signal similar to that shown in FIG. 2 which measures the light intensity with respect to the distance of the confocal plane 71 from a reference plane. The detector 96 may be programmed or set up to provide an output signal 98 whenever the measured light intensity, such as that shown by reference number 26 in FIG. 2, equals or exceeds a predetermined threshold intensity 32. When the threshold 32 is met, the output signal 98 from the detector 96 to the controller 66 is an indication that the bottom 52 of the slot 38 is at a requisite distance to leave the desired amount of remaining material $T_R$ in the outer material layer or skin 40. The controller 66, upon receiving the threshold matching signal 98 from the detector 96 will generate appropriate signals to the laser controller 68 to cease generation of the scoring beam 64 at that point in the sample 42.

Digital signal processing means can be used to increase the signal-to-noise ratio of the signal 98 and, as a result, scoring depth measurement accuracy. One means would be to include a lock-in amplifier 104 between the output of the detector 96 and the controller 66 input. The laser beam 82 can be modulated at a fixed frequency F. The laser beam modulation can be done by direct modulation of the laser 80, the use of external mechanical chopper, or an acousto-optical modulator. The signal 98 is also modulated with the frequency F. When the signal 98 is fed to a lock-in amplifier, such as one commercially available from Stanford Research System, CA, or others, the amplifier 104 can pickup the frequency F signal out of any noise signal. The noise signal may come from debris, smoke, or liquid generated from the scoring process which interferers with the probe beam in or near the slot 38. Noise can also come from environmental air flows, vibrations. All such noise has a broader spectrum or other frequencies different from the modulated frequency F. By only measuring the signal with the frequency F, the effect of noise signals from all of the above sources can be greatly reduced. This enable an increase in the signal-to-noise ratio as well as an increase in the accuracy of laser scoring depth.

Other signal processing techniques can also be used to increase signal-to-noise ratio. For example, accruing multiple depth points and averaging the depth measurements of such points can be used to reduce the noise level. Applied real-time digital filtering to the signal 98 to eliminate noise in certain frequency spectrums can also be used to enhance signal level.

The motion controller 60 continues to move the laser 62 in a predetermined pattern to form the entire slot 38 so that the laser controller 68 continues to supply signals to the laser 62 to generate additional scoring beams 64 as the laser 62 traverses in a predetermined pattern across the sample 42.

As described above and shown in FIG. 4, the outer surface 44 of the sample 42 frequently has an irregular surface configuration formed by graining or other surface ornamentation. A suitable surface measurement detector 100, such as a laser triangulation detector or sensor shown in FIG. 5, generates light beams which are reflected off of the outer surface 44 at the point of formation of the slot 38 to determine the position of the outer surface 44 with respect to a reference plane.

Alternately, the detector 100 can be a confocal measurement device, such as the confocal system 24 described above and shown in FIG. 1. The measured distances from the detector 100 are input to the controller 66 to be used in controlling the position of the lens 88 to move the focal plane 71 and, also, in controlling the generation of the scoring beam 64 by the laser 62 so as to maintain the remaining thickness $T_R$ in the outer material layer 40 of the sample 42 constant as described above and shown in FIG. 4 by $T_R$ and $T_R'$.

To avoid interference or cancellation, the wavelength of the probe beam 82 generated by the laser 80 should be different from the wavelength of the scoring beam 64 generated by the laser 62. For example, if the laser 62 is a carbon dioxide ($CO_2$) laser, the probe beam generating laser 80 should be a laser generating a different wavelength beam, such as an a He-Ne, diode laser or a solid state laser.

Alternately, the lasers 62 and 80 may generate identical wavelength scoring beams 64 and probe beams 82, respectively. A phase offset, or a polarization difference, may be introduced into the probe beam 82, for example, to avoid interference with the scoring beam 64.

Figure 6:
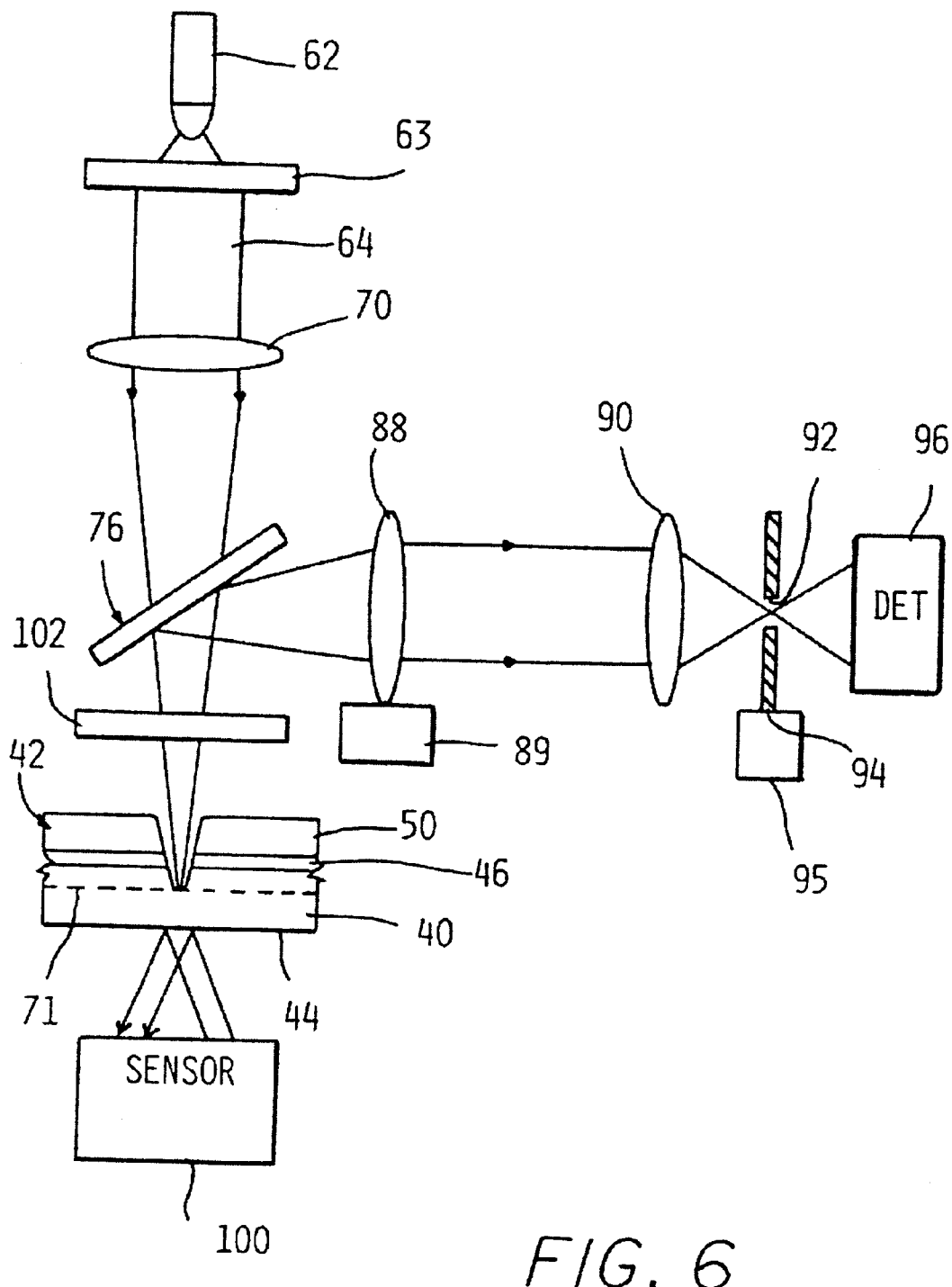
FIG. 6 is a pictorial representation of a confocal laser score measurement apparatus according to another aspect of the present invention.

FIG. 6 depicts another aspect of a confocal imaging apparatus and method used to maintain a constant remaining thickness in a sample in which a scored slot 38 is formed by the laser scoring beam 64. Since certain elements are employed in both aspects shown in FIGS. 5 and 6, the same reference numbers are used to refer to the same component in both FIGS. 5 and 6. In addition, the control elements, such as the controller 66, the motion controller 60 and the laser controller 68, while used in the apparatus shown in FIG. 6, are omitted from FIG. 6 for clarity.

As shown in FIG. 6, after the actual scoring beam 64 has passed through the first lens 70 and the first beam splitter 76 and formed the slot 38 in the sample 42, a percentage of the light will be reflected off of the bottom 52 of the slot 38. This light reflects out of the sample 42 to the surface 90 of the first beam splitter 76 and is reflected through the second focusing lens 88. The second lens 88 is mounted on a movable lens mount 89 to accommodate different locations of the confocal plane 71 in the sample 42.

To avoid interference between the reflected beam and the laser beam 64, the first beam splitter 76 may be a polarization beam splitter which transmits one linear polarization totally and reflects orthogonal polarization totally. Optionally, a quarter wave plate 102 is disposed between the first beam splitter 76 and the sample 42. The quarter wave plate 102 converts the linear polarization of the beam 64 to a circular polarization and, when the circularized light is reflected back from the sample 42, the quarter wave plate 102 converts the light back to a linear polarization in the orthogonal direction. This enables the reflected light to pass to a detector 96 and not be reflected back to the laser 62.

The second lens 88 converts the de-focused reflected beam from the beam splitter 90 to a parallel beam which is focused by the third lens 90 through the aperture or pin hole 92 in the member 94 onto the sensing elements of the light intensity detector 96.

The operation of the apparatus shown in FIG. 6 is identical to that described above for the aspect shown in FIG. 5 in so far as the controller 66 being responsive to output signals from the detector 96 to detect a light intensity matching or exceeding the predetermined threshold 32 so as to cease further exposure by the laser 62 at a predetermined point in the slot 38. The motion controllers 60 or 57 may also be used to control the speed of movement or motion of the laser beam 64, thereby controlling the exposure time of the scoring laser beam 64 on a specific spot in the sample 42.

The confocal optical measurement apparatus and method of the present invention enables a measurement of the depth of a slot scored in a material layer(s) to be determined in real time during formation of the slot. This enables immediate control to be provided to the laser to accurately control the depth of the slot and thereby to maintain the remaining thickness in the material between the bottom of the slot and the spaced outer surface of the material at a constant predetermined thickness. The present apparatus and method also accommodates irregular exterior surfaces of the outer material layer while still maintaining a constant remaining thickness between the bottom of the slot and the outer surface of the material layer.

What is claimed is:

1. A method for forming a slot in a first surface of an article having first and second opposed surfaces, the method comprising the steps of:
   generating a scoring light beam;
   using the beam to form a slot in the article of a predetermined depth in the first surface; and
   confocally determining the remaining thickness in the article between a bottom of the slot and the opposed second surface of the article.

2. The method of claim 1 further comprising the step of:
   controlling the scoring beam in response to the sensed remaining thickness in order to obtain a predetermined constant thickness along an entire length of the slot.

3. The method of claim 1 wherein the step of confocally determining the remaining thickness in the article comprises the steps of:
   generating a detection light beam; and
   directing the detection light beam into the slot and confocally determining the intensity of light reflected from the bottom of the slot with respect to a focal plane at the predetermined depth of the bottom of the slot to provide an output proportional to the remaining thickness in the article between the bottom of the slot and the opposed second surface of the article.

4. The method of claim 3 further comprising the step of:
   preventing interference between the scoring light beam and the detecting light beam.

5. The method of claim 4 wherein the step preventing interference comprises the step of:
   providing the scoring light beam and the detecting light beam with different wavelengths.

6. The method of claim 4 wherein the step of preventing interference comprises the step of:
   providing the scoring light beam and the detecting light beam with identical wavelengths and with one of a phase offset and a polarization difference.

7. The method of claim 1 wherein the step of confocally determining further comprises the steps of:
   establishing a confocal plane at a predetermined stop depth in the article;
   measuring the intensity of light reflected from the slot; and
   comparing the measured light intensity with a threshold intensity to determine when the slot depth equals the predetermined depth of the confocal plane.

8. The method of claim 1 further comprising:
   providing a scoring lightbeam;
   directing the scoring lightbeam into the slot; and
   measuring the light intensity of the reflected scoring lightbeam from the slot.

9. The method of claim 8 further comprising the step of:
   directing the scoring light beam and the scoring lightbeam simultaneously into the article.

10. The method of claim 8 further comprising the step of:
    separating the scoring lightbeam reflected from the slot from the scoring light beam reflected from the slot.

11. The method of claim 7 further comprising the step of:
    directing a portion of the reflected scoring light beam from the slot toward a light intensity detector means.

12. The method of claim 7 wherein the step of comparing the measured light intensity with a threshold further comprises the steps of:
    providing focusing means for focusing reflected measured light beam from the slot in the article onto a light detector means;
    dithering the focusing means; and
    setting the threshold at the zero crossing point of the scoring light intensity slope signal.

13. The method of claim 1 further comprising:
    modulating the probe light beam at a first frequency; and
    selecting only light intensity output from light reflected from a bottom of a slot at the first frequency.

14. A method for forming a slot in a first surface of an article having first and second opposed surfaces, the method comprising the steps of:
    generating a scoring light beam;
    using the beam to form a slot in the article of a predetermined depth in the first surface;
    determining the depth of the slot with respect to one surface of the article as a relation of the magnitude of the intensity of light reflected from the slot;
    modulating the scoring light beam at a first frequency; and
    selecting only the light intensity output at the first frequency.

* * * * *